United States Patent
Chong et al.

(10) Patent No.: US 12,506,746 B2
(45) Date of Patent: Dec. 23, 2025

(54) DATA ANALYSIS METHOD AND APPARATUS

(71) Applicant: HUAWEI TECHNOLOGIES CO., LTD., GuangDong (CN)

(72) Inventors: Weiwei Chong, Shenzhen (CN); Yang Xin, Shanghai (CN); Xiaobo Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 18/187,929

(22) Filed: Mar. 22, 2023

(65) Prior Publication Data

US 2023/0224310 A1 Jul. 13, 2023

Related U.S. Application Data

(63) Continuation of application No. PCT/CN2020/117547, filed on Sep. 24, 2020.

(51) Int. Cl.
*H04L 9/40* (2022.01)

(52) U.S. Cl.
CPC ........ *H04L 63/1408* (2013.01); *H04L 63/123* (2013.01)

(58) Field of Classification Search
CPC .... H04L 63/1408; H04L 63/123; H04W 8/18; H04W 2/106; G06N 20/00
See application file for complete search history.

(56) References Cited

U.S. PATENT DOCUMENTS

| | | | |
|---|---|---|---|
| 10,785,634 B1* | 9/2020 | Fiorese | H04W 8/08 |
| 2020/0288296 A1 | 9/2020 | Fiorese et al. | |
| 2021/0051104 A1* | 2/2021 | He | G06N 20/00 |
| 2021/0329479 A1* | 10/2021 | Al-Dulaimi | G06N 20/00 |

(Continued)

FOREIGN PATENT DOCUMENTS

| | | |
|---|---|---|
| CN | 110049508 A | 7/2019 |
| CN | 110602697 A | 12/2019 |

(Continued)

OTHER PUBLICATIONS

English language translation of WO-2020162719-A1 (41 pages) (Year: 2020).*

(Continued)

*Primary Examiner* — Thomas A Gyorfi
(74) *Attorney, Agent, or Firm* — Rimon PC

(57) ABSTRACT

This application discloses a data analysis method and an apparatus. In the method, a data analysis network element sends a first request message to a security network element, where the first request message is used to request to perform security detection on first data, and the first data is data for which the data analysis network element performs data analysis on a specified data analysis type. The data analysis network element generates or updates, based on a security detection result, a data analysis result corresponding to the data analysis type. The security network element performs security detection on the first data, and separate abnormal data from the first data, so that the data analysis network element can establish a model based on data other than the abnormal data, to improve accuracy of the model and accuracy of the data analysis result.

20 Claims, 6 Drawing Sheets

(56) References Cited

U.S. PATENT DOCUMENTS

2021/0349747 A1* 11/2021 Albasheir ............. G06F 11/302
2021/0392477 A1* 12/2021 Taft ...................... H04W 12/37

FOREIGN PATENT DOCUMENTS

| CN | 111147422 A | 5/2020 | |
|---|---|---|---|
| CN | 111148105 A | 5/2020 | |
| CN | 111240975 A | 6/2020 | |
| WO | WO-2020162719 A1 * | 8/2020 | |
| WO | WO-2022032450 A1 * | 2/2022 | ............. H04L 41/14 |

OTHER PUBLICATIONS

English language translation for WO-2022032450-A1 (Year: 2022).*
3rd Generation Partnership Project; Technical Specification Group Services and System Aspects; Architecture Enhancements for 5G System (5GS) to support network data analytics services (Release 16); 3GPP TS 23.288 V16.4.0 (Jul. 2020); 66 total pages.
3GPP TR 23.700-91 V1.0.0 (Sep. 2020), 3rd Generation Partnership Project; Technical Specification Group Services and System Aspects; Study on enablers for network automation for the 5G System (5GS); Phase 2(Release 17), 304 pages.
Sevgican Salih et al: "Intelligent Network Data Analytics Function in 5G Cellular Networks Using Machine Learning," Journal of Communications and Networks, vol. 22, No. 3, Jun. 2020; pp. 269-280; 12 total pages.

* cited by examiner

DATA ANALYSIS METHOD AND APPARATUS

CROSS-REFERENCE TO RELATED APPLICATIONS

This application is a continuation of International Application No. PCT/CN2020/117547, filed on Sep. 24, 2020, the disclosure of which is hereby incorporated by reference in its entirety.

TECHNICAL FIELD

This application generally relates to the field of communication technologies, and in particular, to a data analysis method and an apparatus.

BACKGROUND

In a 5th generation (5G) mobile communication system, a network data analytics function (NWDAF) network element is introduced. The NWDAF network element may first obtain data related to a communication network, a terminal device, and the like. The NWDAF network element may then train and generate an artificial intelligence (AI) model based on the obtained data, and obtain a data analysis result based on the AI model. The NWDAF network element may then finally send the analysis result to another function network element. The another function network element may execute a corresponding communication service policy with reference to the analysis result.

In this process, an attacker may add abnormal data to the data that is obtained by the NWDAF network element and that is related to the communication network, the terminal device, and the like, and consequently the data obtained by the NWDAF network element includes the abnormal data. As a result, the data analysis result generated by the NWDAF is inaccurate.

SUMMARY

This application provides a data analysis method and an apparatus, to improve accuracy of a data analysis result.

According to a first aspect, this application provides a data analysis method. The method includes that a data analysis network element sends a first request message to a security network element, where the first request message is used to request performing security detection on first data, and the first data is data for which the data analysis network element performs data analysis on a specified data analysis type. The data analysis network element receives a security detection result fed back by the security network element. The data analysis network element generates or updates, based on the security detection result, a data analysis result corresponding to the data analysis type.

Based on the foregoing technical solutions, the data analysis network element may send the request message to the security network element, the security network element performs security detection on to-be-analyzed data, and then the data analysis network element generates or updates the data analysis result based on the security detection result. In this way, accuracy of the data analysis result can be improved.

In some embodiments, the data analysis network element may trigger a security detection request in the following several cases. Details are as follows:

Case 1: When determining that accuracy of a first analysis result is low, the data analysis network element may trigger the security detection request to the security network element. It may be understood that the security detection request is the first request message.

In a possible implementation, before that a data analysis network element sends a first request message to a first network element (e.g., such as the security network element), the method further includes that the data analysis network element generates, based on the first data, the first analysis result corresponding to the data analysis type. The data analysis network element determines that the accuracy of the first analysis result is lower than a first threshold.

Based on the foregoing technical solutions, the data analysis network element may obtain the first analysis result in advance based on the to-be-analyzed data; and when the accuracy of the first analysis result is low, request the security network element to perform security detection. In this way, the data analysis network element may update the first analysis result after the security detection is performed, thereby improving the accuracy of the data analysis result.

Case 2: When receiving a notification message sent by a subscription network element, the data analysis network element may trigger the security detection request to the security network element.

In a possible implementation, before that a data analysis network element sends a first request message to a first network element (e.g., such as the security network element), the method further includes that the data analysis network element generates, based on the first data, a first analysis result corresponding to the data analysis type. The data analysis network element sends the first analysis result and a first threshold to the subscription network element, where the first threshold is used by the subscription network element to determine that accuracy of the first analysis result is lower than the first threshold. The data analysis network element receives the notification message sent by the subscription network element when the accuracy of the first analysis result is lower than the first threshold. The data analysis network element sends the first request message to the security network element based on the notification message.

Based on the foregoing technical solutions, the subscription network element may determine the accuracy of the first analysis result; and when the accuracy of the first analysis result is low, notify the data analysis network element. Then, the data analysis network element requests the security network element to perform security detection.

Case 3: When a data analysis request message sent by a subscription network element is a data analysis result corresponding to a specified range, the data analysis network element may trigger the security detection request.

In a possible implementation, before that a data analysis network element sends a first request message to a security network element, the method further includes: the data analysis network element receives the data analysis request message sent by the subscription network element, where the data analysis request message is used to request the data analysis result corresponding to the data analysis type. The data analysis network element determines the data analysis result, corresponding to the specified range, that is requested by the data analysis request message.

Based on the foregoing technical solutions, if the data analysis result subscribed to by the subscription network element is the data analysis result within the specified range, the data analysis network element may request the security network element to perform security detection.

In a possible implementation, the specified range includes a range corresponding to at least one of the following types of information: time information, area information, slice information, user information, or specified service type information.

Case 4: The data analysis network element may actively send the security detection request to the security network element at a fixed time interval.

Based on the foregoing several cases, the data analysis network element may send the first request message to the security network element, so that the security network element performs security detection on the first data.

In a possible implementation, the data analysis network element may send the data analysis result to the subscription network element, so that the subscription network element views the subscribed data analysis result of the specified data analysis type.

In a possible implementation, the first request message includes at least one of the following types of information: information about the first data, a first model, or a first algorithm; and the first model is a model established by the data analysis network element based on the first data or a model determined by the data analysis network element in advance for the data analysis type, and the first algorithm includes at least one algorithm used when the data analysis network element establishes the first model.

It should be noted that the information about the first data may be the first data, or may be a storage address of the first data, or certainly may be a file name or the like of the first data. This is not limited in this application.

Based on the foregoing technical solutions, the security network element may perform security detection on the first data by using the information included in the first request message, to separate abnormal data from the first data, and improve the accuracy of the data analysis result.

In a possible implementation, the security detection is abnormal data detection; and the first request message includes an abnormal data proportion, and the abnormal data proportion indicates a proportion of a data volume of abnormal data to a data volume of the first data.

In the foregoing technical solutions, the abnormal data proportion may be estimated by the data analysis network element or the security network element. In this way, the security network element may know the abnormal data proportion existing in the first data, so that the security network element may perform security detection in a targeted way, and the security detection result is more accurate.

In a possible implementation, the security detection result includes at least one of the following types of information: information about the abnormal data, information about second data, or a second algorithm; and the second data is data other than the abnormal data in the first data, and the second algorithm is a detection algorithm used by the security network element to obtain the abnormal data or the second data.

Based on the foregoing technical solutions, the data analysis network element requests the security network element to perform security detection on the first data. After the security network element performs security detection, the abnormal data and/or the data other than the abnormal data may be obtained. In this way, the abnormal data may be separated from the first data, so that the data analysis result is obtained by using the data other than the abnormal data, and the accuracy of the data analysis result is improved.

In a possible implementation, the security detection result includes a second model, and the second model is a model established by the first network element based on the second data; and that the data analysis network element generates or updates, based on the security detection result, a data analysis result corresponding to the data analysis type includes: the data analysis network element generates or updates, based on the second model, the data analysis result corresponding to the data analysis type.

It should be noted that the second model may be understood as a recommendation model obtained after the security network element performs security detection.

Based on the foregoing technical solutions, if the security detection result includes the recommendation model, the data analysis network element may directly use the recommendation model to obtain the data analysis result. In this way, the accuracy of the data analysis result can be improved.

In a possible implementation, that the data analysis network element generates or updates, based on the security detection result, a data analysis result corresponding to the data analysis type includes: the data analysis network element obtains the second data based on the security detection result, where the second data is data other than the abnormal data in the first data. The data analysis network element trains the second data to obtain a third model, and generates or updates, based on the third model, the data analysis result corresponding to the data analysis type.

It should be noted that, that the data analysis network element obtains the second data based on the security detection result may include two cases: (1) the data analysis network element directly obtains the second data from the security detection result. (2) The data analysis network element obtains the second data based on the abnormal data in the security detection result.

Based on the foregoing technical solutions, the data analysis network element may obtain a new model through retraining by using the data other than the abnormal data, and then obtain the data analysis result based on the new model. In this way, accuracy of an artificial intelligence (AI) model can be improved, and the accuracy of the data analysis result can be improved.

In a possible implementation, when the security detection result includes the second algorithm, that the data analysis network element trains the second data to obtain a third model includes: the data analysis network element trains the second data by using the second algorithm to obtain the third model.

In a possible implementation, the first data is training data or inference data corresponding to the data analysis type.

In a possible implementation, the security network element is a security network data analytics function (NWDAF) network element.

In a possible implementation, the security detection is data poisoning detection.

It should be noted that poisoning data is abnormal data or attack data, generated by an attacker, whose distribution is similar to that of normal data and that affects the accuracy of the data analysis result. An existing data cleaning or outlier detection method cannot easily identify the poisoning data.

According to a second aspect, this application provides a data analysis method. The method includes: a security network element receives a first request message sent by a data analysis network element, where the first request message is used to request to perform security detection on first data, and the first data is a dataset for which the data analysis network element performs data analysis on a specified data analysis type. The security network element performs security detection on the first data to obtain a security detection result. The security network element sends the security detection result to the data analysis network element.

Based on the foregoing technical solution, the security network element may perform security detection on the first data, to separate abnormal data from the first data, so that the data analysis network element can obtain a data analysis result based on the security detection result, to improve accuracy of the data analysis result.

In a possible implementation, the first request message includes at least one of the following types of information: information about the first data, a first model, or a first algorithm; and the first model is a model established by the data analysis network element based on the first data or a model determined by the data analysis network element in advance for the data analysis type, and the first algorithm includes at least one algorithm used when the data analysis network element establishes the first model.

In a possible implementation, the security detection is abnormal data detection; and the first request message includes an abnormal data proportion, and the abnormal data proportion indicates a proportion of a data volume of abnormal data to a data volume of the first data.

In a possible implementation, the security detection result includes at least one of the following types of information: information about the abnormal data, information about second data, or a second algorithm; and the second data is data other than the abnormal data in the first data, and the second algorithm is a detection algorithm used by the security network element to obtain the abnormal data or the second data.

In a possible implementation, the security detection result includes a second model, and the second model is a model established by the security network element based on the second data.

In a possible implementation, that the security network element performs security detection on the first data includes: the security network element performs security detection on the first data by using the second algorithm.

In a possible implementation, the method further includes: the security network element determines the second algorithm based on the first algorithm and/or a third algorithm, where the first algorithm includes at least one algorithm used when the data analysis network element establishes the first model, and the third algorithm is at least one algorithm stored in the security network element in advance.

In a possible implementation, that the security network element determines the second algorithm based on the first algorithm and/or a third algorithm includes: the security network element determines an intersection set of the first algorithm and the third algorithm as the second algorithm.

Certainly, it may be understood that the security network element may alternatively determine an algorithm for performing security detection independently, that is, may not refer to the first algorithm. This is not limited in this application.

In a possible implementation, the first data is training data or inference data corresponding to the data analysis type.

In a possible implementation, the security network element is a security NWDAF network element.

In a possible implementation, the security detection is data poisoning detection.

According to a third aspect, this application provides a data analysis apparatus. The data analysis apparatus has a function of implementing the behavior in the method example in the first aspect. The function may be implemented by using hardware, or may be implemented by hardware executing corresponding software. The hardware or the software includes one or more modules corresponding to the foregoing function. The data analysis apparatus includes: a communication unit (e.g., communication circuit), configured to: send a first request message to a security network element, where the first request message is used to request to perform security detection on first data, and the first data is data for which the data analysis apparatus performs data analysis on a specified data analysis type; and receive a security detection result fed back by the security network element; and a processing unit (e.g., processing circuit), configured to generate or update, based on the security detection result, a data analysis result corresponding to the data analysis type.

In a possible implementation, the processing unit is further configured to: before the first request message is sent to a first network element (e.g., such as the security network element), generate, based on the first data, a first analysis result corresponding to the data analysis type, and determine that accuracy of the first analysis result is lower than a first threshold.

In a possible implementation, the processing unit is further configured to: before the first request message is sent to a first network element (e.g., such as the security network element), generate, based on the first data, a first analysis result corresponding to the data analysis type; the communication unit is further configured to: send the first analysis result and a first threshold to a subscription network element, where the first threshold is used by the subscription network element to determine that accuracy of the first analysis result is lower than the first threshold; and receive a notification message sent by the subscription network element when the accuracy of the first analysis result is lower than the first threshold; and the communication unit is configured to send the first request message to the security network element in the following manner: sending the first request message to the security network element based on the notification message.

In a possible implementation, the communication unit is further configured to: before the first request message is sent to the security network element, receive a data analysis request message sent by a subscription network element, where the data analysis request message is used to request the data analysis result corresponding to the data analysis type; and the processing unit is further configured to determine a data analysis result, corresponding to a specified range, that is requested by the data analysis request message.

In a possible implementation, the specified range includes a range corresponding to at least one of the following types of information: time information, area information, slice information, user information, or specified service type information.

In a possible implementation, the first request message includes at least one of the following types of information: information about the first data, a first model, or a first algorithm; and the first model is a model established by the data analysis network element based on the first data or a model determined by the data analysis network element in advance for the data analysis type, and the first algorithm includes at least one algorithm used when the data analysis network element establishes the first model.

In a possible implementation, the security detection is abnormal data detection; and the first request message includes an abnormal data proportion, and the abnormal data proportion indicates a proportion of a data volume of abnormal data to a data volume of the first data.

In a possible implementation, the security detection result includes at least one of the following types of information: information about the abnormal data, information about second data, or a second algorithm; and the second data is data other than the abnormal data in the first data, and the second algorithm is a detection algorithm used by the security network element to obtain the abnormal data or the second data.

In a possible implementation, the security detection result includes a second model, and the second model is a model established by the first network element based on the second data; and the processing unit is configured to generate or update, based on the security detection result, the data analysis result corresponding to the data analysis type in the following manner: generating or updating, based on the second model, the data analysis result corresponding to the data analysis type.

In a possible implementation, the processing unit is configured to generate or update, based on the security detection result, the data analysis result corresponding to the data analysis type in the following manner: obtaining the second data based on the security detection result, where the second data is data other than the abnormal data in the first data; and training the second data to obtain a third model, and generating or updating, based on the third model, the data analysis result corresponding to the data analysis type.

In a possible implementation, when the security detection result includes the second algorithm, that the processing unit is configured to train the second data in the following manner to obtain a third model includes: training the second data by using the second algorithm to obtain the third model.

In a possible implementation, the first data is training data or inference data corresponding to the data analysis type.

In a possible implementation, the security network element is a security network data analytics function (NWDAF) network element.

In a possible implementation, the security detection is data poisoning detection.

According to a fourth aspect, this application provides a data analysis apparatus. The data analysis apparatus has a function of implementing the behavior in the method example in the second aspect. The function may be implemented by using hardware, or may be implemented by hardware executing corresponding software. The hardware or the software includes one or more modules corresponding to the foregoing function. In a possible design, the data analysis apparatus includes: a communication unit, configured to receive a first request message sent by a data analysis network element, where the first request message is used to request to perform security detection on first data, and the first data is a dataset for which the data analysis network element performs data analysis on a specified data analysis type; and a processing unit, configured to perform security detection on the first data to obtain a security detection result, where the communication unit is further configured to send the security detection result to the data analysis network element.

In a possible implementation, the first request message includes at least one of the following types of information: information about the first data, a first model, or a first algorithm; and the first model is a model established by the data analysis network element based on the first data or a model determined by the data analysis network element in advance for the data analysis type, and the first algorithm includes at least one algorithm used when the data analysis network element establishes the first model.

In a possible implementation, the security detection is abnormal data detection; and the first request message includes an abnormal data proportion, and the abnormal data proportion indicates a proportion of a data volume of abnormal data to a data volume of the first data.

In a possible implementation, the security detection result includes at least one of the following types of information: information about the abnormal data, information about second data, or a second algorithm; and the second data is data other than the abnormal data in the first data, and the second algorithm is a detection algorithm used by the security network element to obtain the abnormal data or the second data.

In a possible implementation, the security detection result includes a second model, and the second model is a model established by the security network element based on the second data.

In a possible implementation, the processing unit is configured to perform security detection on the first data in the following manner: performing security detection on the first data by using the second algorithm.

In a possible implementation, the processing unit is further configured to determine the second algorithm based on the first algorithm and/or a third algorithm, where the first algorithm includes at least one algorithm used when the data analysis network element establishes the first model, and the third algorithm is at least one algorithm stored in the security network element in advance.

In a possible implementation, the processing unit is configured to determine the second algorithm based on the first algorithm and/or the third algorithm in the following manner: determining an intersection set of the first algorithm and the third algorithm as the second algorithm.

In a possible implementation, the first data is training data or inference data corresponding to the data analysis type.

In a possible implementation, the data analysis apparatus is a security NWDAF network element.

In a possible implementation, the security detection is data poisoning detection.

According to a fifth aspect, a data analysis apparatus is provided. The data analysis apparatus may be the data analysis network element in the foregoing method embodiments. The data analysis apparatus may include a transceiver and at least one processor. The transceiver is configured to perform message receiving and sending operations performed by the data analysis apparatus in the method according to any one of the first aspect or the implementations of the first aspect; and the at least one processor invokes instructions to perform a message processing operation performed by the data analysis apparatus in the method according to any one of the first aspect or the implementations of the second aspect.

According to a sixth aspect, a data analysis apparatus is provided. The data analysis apparatus may be the security network element in the foregoing method embodiments. The data analysis apparatus may include a transceiver and at least one processor. The transceiver is configured to perform message receiving and sending operations performed by the data analysis apparatus in the method according to any one of the second aspect or the implementations of the second aspect; and the at least one processor invokes instructions to perform a message processing operation performed by the data analysis apparatus in the method according to any one of the second aspect or the implementations of the second aspect.

According to a seventh aspect, a computer program product is provided. The computer program product includes computer program code. When the computer program code is run, the methods performed by the data analysis network element in the foregoing aspects are performed.

According to an eighth aspect, a computer program product is provided. The computer program product includes computer program code. When the computer program code is run, the methods performed by the security network element in the foregoing aspects are performed.

According to a ninth aspect, this application provides a chip system. The chip system includes at least one processor and a transceiver. The processor runs instructions to perform the method according to any one of the first aspect and the second aspect or the implementations of the first aspect and the second aspect. The chip system may include a chip, or may include a chip and another discrete component.

According to a tenth aspect, this application further provides a data analysis system. The data analysis system includes the data analysis apparatus according to any one of the third aspect or the implementations of the third aspect and the data analysis apparatus according to any one of the fourth aspect or the implementations of the fourth aspect.

According to an eleventh aspect, this application provides a computer-readable storage medium. The computer-readable storage medium stores a computer program. When the computer program is run, the methods performed by the data analysis network element in the foregoing aspects are implemented.

According to a twelfth aspect, this application provides a computer-readable storage medium. The computer-readable storage medium stores a computer program. When the computer program is run, the methods performed by the security network element in the foregoing aspects are implemented.

It should be understood that, for beneficial effects achieved by the technical solutions in the third aspect to the twelfth aspect and the corresponding feasible implementations in embodiments of this application, refer to the foregoing technical effects in the first aspect and the second aspect and the corresponding possible implementations of the first aspect and the second aspect. Details are not described herein again.

DESCRIPTION OF EMBODIMENTS

Figure 1:
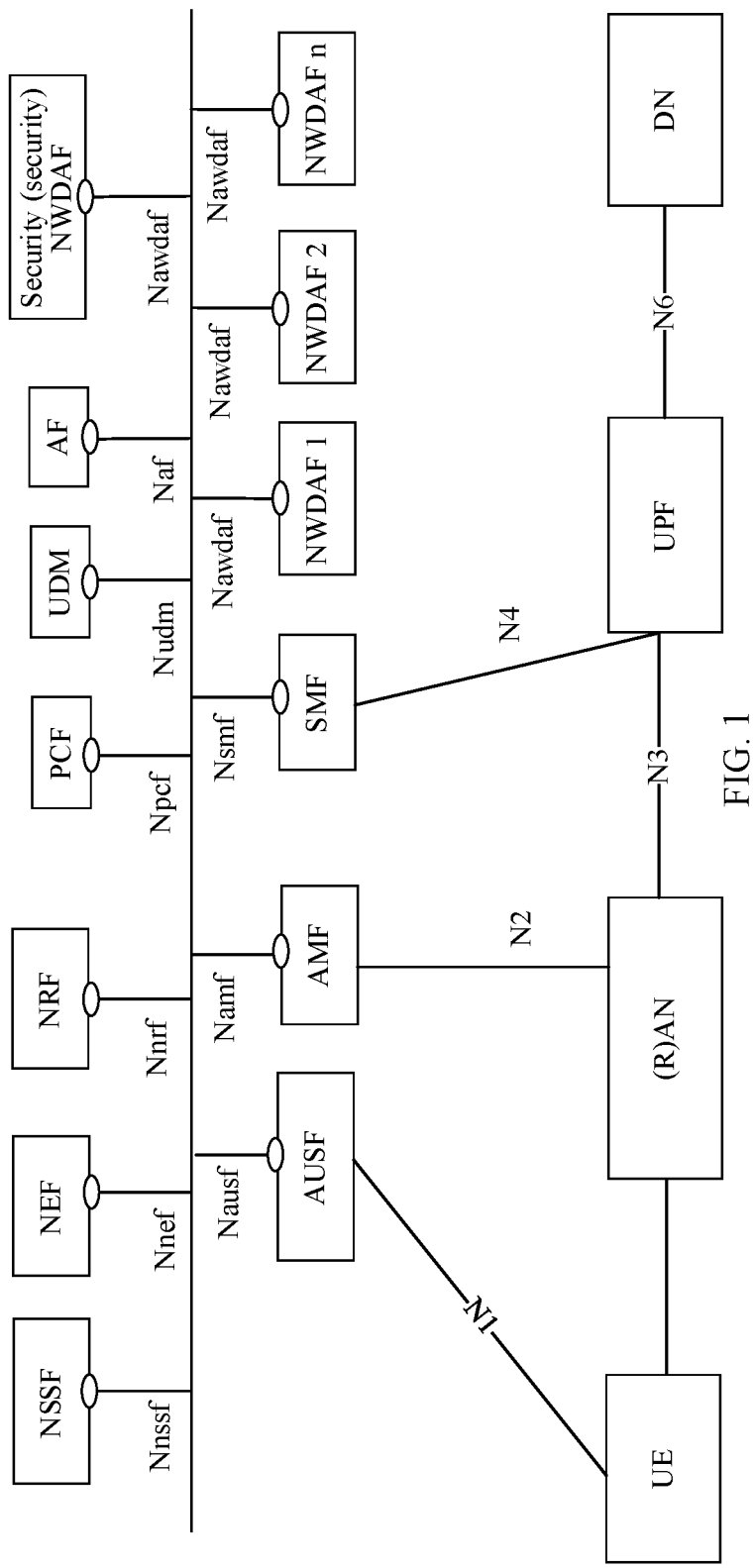
FIG. 1 is a schematic diagram of a fifth generation (5G) network architecture based on a service-based interface according to an embodiment of this application.

To make objectives, technical solutions, and advantages of embodiments of this application clearer, the following further describes embodiments of this application in detail with reference to the accompanying drawings.

Currently, a data analysis process may include the following steps: First, a data analysis result subscriber (e.g., consumer) triggers a service operation of a network data analytics function (NWDAF), where the operation is used to subscribe to a type of a data analysis result. After receiving the service operation triggered by the consumer, the NWDAF may obtain related network data, terminal device data, third-party application data, and the like from a corresponding network element based on the type of the data analysis result subscribed to by the consumer, then uses the various obtained data to train and generate a corresponding artificial intelligence (AI) model, and performs data inference based on the AI model to obtain the data analysis result. Finally, the NWDAF feeds back the AI model or the data analysis result to the consumer. In this process, an attacker may inject, into the network data obtained by the NWDAF, poisoning data similar to real data. As a result, there is abnormal data in the network data, and consequently precision of the trained model is low, and an obtained inference data analysis result is also inaccurate.

It should be noted that the poisoning data is a data sample designed when the attacker performs a data poisoning attack on the AI model, and may be used to pollute training data used by the trained model or inference data used by the model for inference. Consequently, this endangers a normal function of an entire AI system and accuracy of the data analysis result.

It may be understood that the type of the data analysis result may include but is not limited to: a service experience data analysis result, a network element load data analysis result, a user equipment (UE) service behavior analysis result, a UE mobility analysis result, a UE interaction analysis result, a UE abnormal behavior analysis result, and the like.

In addition, before the obtained data is used to train and generate the corresponding AI model, data cleaning needs to be performed to obtain accurate and high-quality data. Because distribution of the poisoning data is similar to distribution of the real data, it is difficult to completely remove the poisoning data during data cleaning. Consequently, this endangers the normal function of the AI system.

In view of the foregoing existing technical problem, in embodiments of this application, a network element is added to a fifth generation (5G) network architecture, the newly added network element detects abnormal data, and then feeds back a detection result to an NWDAF network element. The NWDAF network element then trains an AI model or generates a data analysis result based on the fed-back detection result. In this way, accuracy of the data analysis result can be improved, and security of the AI model can be ensured.

It should be noted that the newly added network element in the 5G network architecture may be a network element responsible for security. More specifically, in this application, the newly added network element may be an NWDAF network element responsible for security.

FIG. 1 is a schematic diagram of a 5G network architecture based on a service-based interface according to an embodiment of this application. In some embodiments, the network architecture includes three parts: a data analysis result subscriber (e.g., consumer), a data provider network element, and a data analysis function network element.

The data analysis function network element may include an NWDAF network element and a security NWDAF network element.

The NWDAF network element can collect data from a network function (NF) network element, an operation, administration, and maintenance (OAM) system, a terminal device, or an application function (AF) network element, and analyze the collected data to obtain a data analysis result. The NWDAF network element may further send the obtained data analytics result to the NF, the OAM system, the terminal device, or the AF network element, so that these entities perform corresponding policy formulation, operation execution, and the like.

The security NWDAF network element is configured to provide a data analysis function of a security service, and may interact with the NWDAF network element to provide the security service such as abnormal data detection.

The data provider network element is a node or a physical device in a network, and may provide corresponding function support for UE to access a network, perform a session, perform authentication and authorization, control a policy, and the like, and may also generate corresponding network data. For example, the data provider network element may include an access and mobility management function (AMF) network element, a session management function (SMF) network element, an AF, and the like.

The AMF network element is a control plane network element provided by an operator network, and is responsible for access control and mobility management for accessing the operator network by the terminal device, for example, including functions such as mobility status management, allocation of a temporary user identity, and user authentication and authorization.

The SMF network element is a control plane network element provided by the operator network, and is responsible for managing a protocol data unit (PDU) session of the terminal device. The PDU session is a channel used to transmit a PDU, and the terminal device needs to transmit the PDU to a data network (DN) through the PDU session. The SMF network element is responsible for establishment, maintenance, deletion, and the like of the PDU session. The SMF network element includes session-related functions such as session management (for example, session establishment, modification, and release, including maintenance of a tunnel between a user plane function (UPF) and an access network (AN)), selection and control of the UPF network element, service and session continuity (SSC) mode selection, and roaming.

The AF network element mainly provides an application layer service, and further supports interacting with a 5G core network to provide a service, for example, affecting a data routing decision and a policy control function, or providing some third-party services for a network side.

The data analysis result subscriber (e.g., consumer) is an OAM, some NFs (for example, a policy control function (PCF)), UE, a radio access network (RAN), an AF, or the like in the 5G network structure. These entities may subscribe to the corresponding data analysis result from the NWDAF, and make a corresponding adjustment based on the data analysis result. For example, the PCF may adjust a quality of service (QoS) parameter of a service based on service-level service experience fed back by the NWDAF, to better ensure service experience of the service.

The PCF network element is a control plane function provided by an operator, and is configured to provide a policy to a network element in a network. In an implementation, the policy may include an access control policy, a mobility management policy, a charging-related policy, a QoS-related policy, an authorization-related policy, and the like.

The terminal device, which may also be referred to as UE, is a device that has a wireless transceiver function, and may be deployed on land, for example, an indoor device, an outdoor device, a handheld device, or a vehicle-mounted device; or may be deployed on water (for example, on a ship); or may be deployed in the air (for example, on an airplane, a balloon, or a satellite). The terminal device may be a mobile phone, a tablet computer (e.g., pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like.

The terminal device may establish a connection to the operator network through an interface (for example, N1) provided by the operator network, and use services such as a data service and/or a voice service provided by the operator network. The terminal device may further access the DN through the operator network, and use an operator service deployed in the DN and/or a service provided by a third party. The third party may be a service provider other than the operator network and the terminal device, and may provide services such as a data service and/or a voice service for the terminal device. A specific representation form of the third party may be determined based on an actual application scenario, and is not limited herein.

It should be noted that the network architecture may further include a network exposure function (NEF) network element, a unified data management (UDM) network element, a network repository function (NRF) network element, an authentication server function (AUSF) network element, a RAN, a UPF network element, and the like.

The RAN is a subnet of the operator network, and is an implementation system between a service node in the operator network and the terminal device. To access the operator network, the terminal device first passes through the RAN, and may be connected to the service node in the operator network through the RAN. A RAN device in this application is a device that provides a wireless communication function for the terminal device. The access network device includes but is not limited to a next generation NodeB (gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission reception point (TRP), a transmission point (TP), a mobile switching center, and the like.

The DN may also be referred to as a packet data network (PDN), and is a network located outside the operator network. The operator network may access a plurality of DNs, and a plurality of services may be deployed in the DNs, to provide services such as a data service and/or a voice service for the terminal device. For example, the DN is a private network of a smart factory, a sensor installed in a workshop of the smart factory may be a terminal device, a control server of the sensor is deployed in the DN, and the control server may serve the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like in the internal office network of the company.

The UDM network element is a control plane network element provided by the operator, and is responsible for storing information such as a subscription permanent identifier (SUPI), a credential, a security context, and subscription data of a subscriber in the operator network. The information stored in the UDM network element may be used for authentication and authorization when the terminal device accesses the operator network. The subscriber in the operator network may be a user using a service provided by the operator network, for example, a user using a subscriber identity/identification module (SIM) card of China Telecom, or a user using a SIM card of China Mobile. The SUPI of the subscriber may be a number of the SIM card or the like. The credential and the security context of the subscriber may be stored in small files such as an encryption key of the SIM card or information related to encryption of the SIM card, and are used for authentication and/or authorization. The security context may be cookie, a token, or the like stored in a local terminal (for example, a mobile phone) of the user. The subscription data of the subscriber may be a supporting service of the SIM card, for example, a traffic package or a used network of the SIM card. It should be noted that the permanent identifier, the credential, the security context, the cookie, and the token are equivalent to information related to authentication and authorization, and are not limited or distinguished between each other for ease of description in this application document of the present disclosure. Unless otherwise specified, the security context is used as an example for description in embodiments of this application. However, embodiments of this application are also applicable to authentication and/or authorization information described in another manner.

The NEF network element is a control plane network element provided by the operator. The NEF network element securely exposes an external interface of the operator network to the third party. When the SMF network element needs to communicate with a third-party network element, the NEF network element may serve as a relay for communication between the SMF network element and the third-party network element. When the NEF network element serves as the relay, the NEF network element may translate identification information of the subscriber and identification information of the third-party network element. For example, when the NEF needs to send the SUPI of the subscriber from the operator network to the third party, the NEF may translate the SUPI into an external identity (ID) corresponding to the subscriber. On the contrary, when the NEF network element sends an external ID (an ID of the third-party network element) to the operator network, the NEF network element may translate the external ID into an SUPI.

The NRF network element may be configured to provide a network element discovery function, and provide, based on a request of another network element, network element information corresponding to a network element type, for example, address information and/or identification information. The NRF further provides a network element management service, for example, registration, update, and deregistration of a network element and subscription and push of a network element status.

The AUSF network element is a control plane network element provided by the operator, and may be usually used for level-1 authentication, namely, authentication between the terminal device (the subscriber) and the operator network. After receiving an authentication request initiated by the subscriber, the AUSF network element may perform authentication and/or authorization on the subscriber by using authentication information and/or authorization information stored in the UDM network element, or generate authentication and/or authorization information of the subscriber through the UDM network element. The AUSF network element may feed back the authentication information and/or authorization information to the subscriber.

The UPF network element is a gateway provided by the operator, and is a gateway for communication between the operator network and the DN. The UPF network element includes user plane-related functions such as data packet routing and transmission, packet detection, service usage reporting, QoS processing, lawful interception, uplink packet detection, and downlink data packet storage.

In FIG. 1, Nnef, Nausf, Npcf, Nudm, Naf, Namf, Nsmf, N1, N2, N3, N4, and the like are interface sequence numbers. For meanings of these interface sequence numbers, refer to meanings defined in the 3rd generation partnership project (3GPP) standard protocol. This is not limited herein.

It should be noted that this application is not limited to the 5G system shown in FIG. 1, and may be further applied to a future communication system, for example, a 6th generation (6G) system.

In the following, for ease of description, an NWDAF network element is referred to as an NWDAF for short, or is denoted as a "data analysis network element"; a data provider network element is denoted as a "first network element"; a security NWDAF network element is referred to as a security NWDAF for short, or is denoted as a "security network element"; and a data analysis result subscriber is denoted as a "subscription network element". The following uses an example in which the data analysis network element is the NWDAF and the security network element is the security NWDAF for description.

In embodiments of this application, the NWDAF network element may be an independent network element, or may be co-located with another network element. For example, the NWDAF network element is co-located with an AMF network element or an SMF network element. In another possible implementation, another network element may alternatively have a related function of the NWDAF network element. For example, the AMF network element or the SMF network element has the related function of the NWDAF network element.

Figure 2:
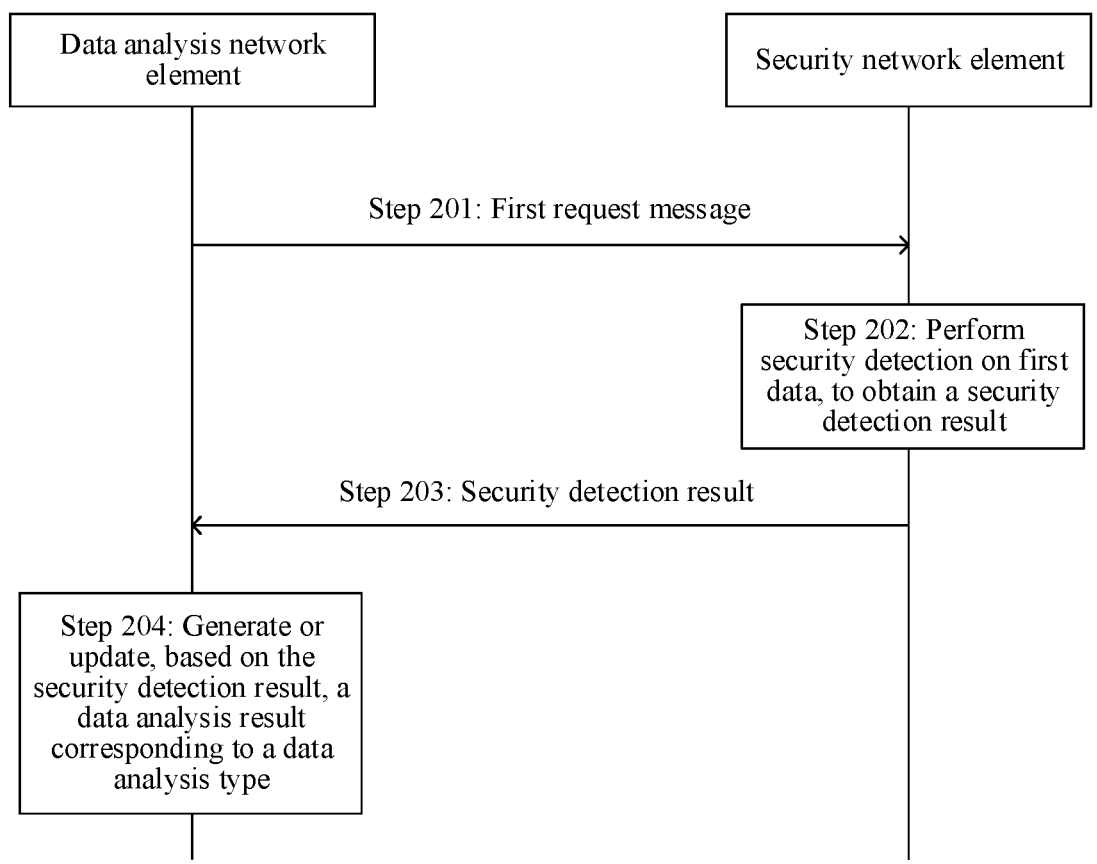
FIG. 2 is a flowchart of a data analysis method according to an embodiment of this application.

FIG. 2 is a flowchart of a data analysis method according to an embodiment of this application. As shown in FIG. 2, the method may include the following steps.

Step 201: A data analysis network element sends a first request message to a security network element. Correspondingly, the security network element receives the first request message sent by the data analysis network element.

The first request message is used to perform security detection on first data, and the first data is data for which the data analysis network element performs data analysis on a specified data analysis type.

Step 202: The security network element performs security detection on the first data to obtain a security detection result.

Step 203: The data analysis network element receives the security detection result fed back by the security network element.

After receiving the first request message, the security network element may perform security detection on the first data to obtain the security detection result. In addition, the security network element may feed back the security detection result to the data analysis network element.

Step 204: The data analysis network element generates or updates, based on the security detection result, a data analysis result corresponding to the data analysis type.

In some embodiments, after receiving the security detection result, the data analysis network element may generate, based on the security detection result, the data analysis result corresponding to the data analysis type, or update the data analysis result corresponding to the data analysis type.

In some embodiments, the data analysis network element may first analyze the first data to obtain the data analysis result, and then request, based on the data analysis result, the security network element to perform security detection on the first data to obtain the security detection result. Finally, the data analysis network element updates the first obtained data analysis result based on the security detection result to obtain a new data analysis result.

In some other embodiments, after obtaining the first data, the data analysis network element may directly trigger a security detection request to the security network element. Then, the security network element performs security detection on the first data to obtain the security detection result. Finally, the data analysis network element generates the data analysis result based on the security detection result of the security network element for the first data.

The following describes the embodiment shown in FIG. 2 in detail with reference to specific embodiments.

Figure 3:
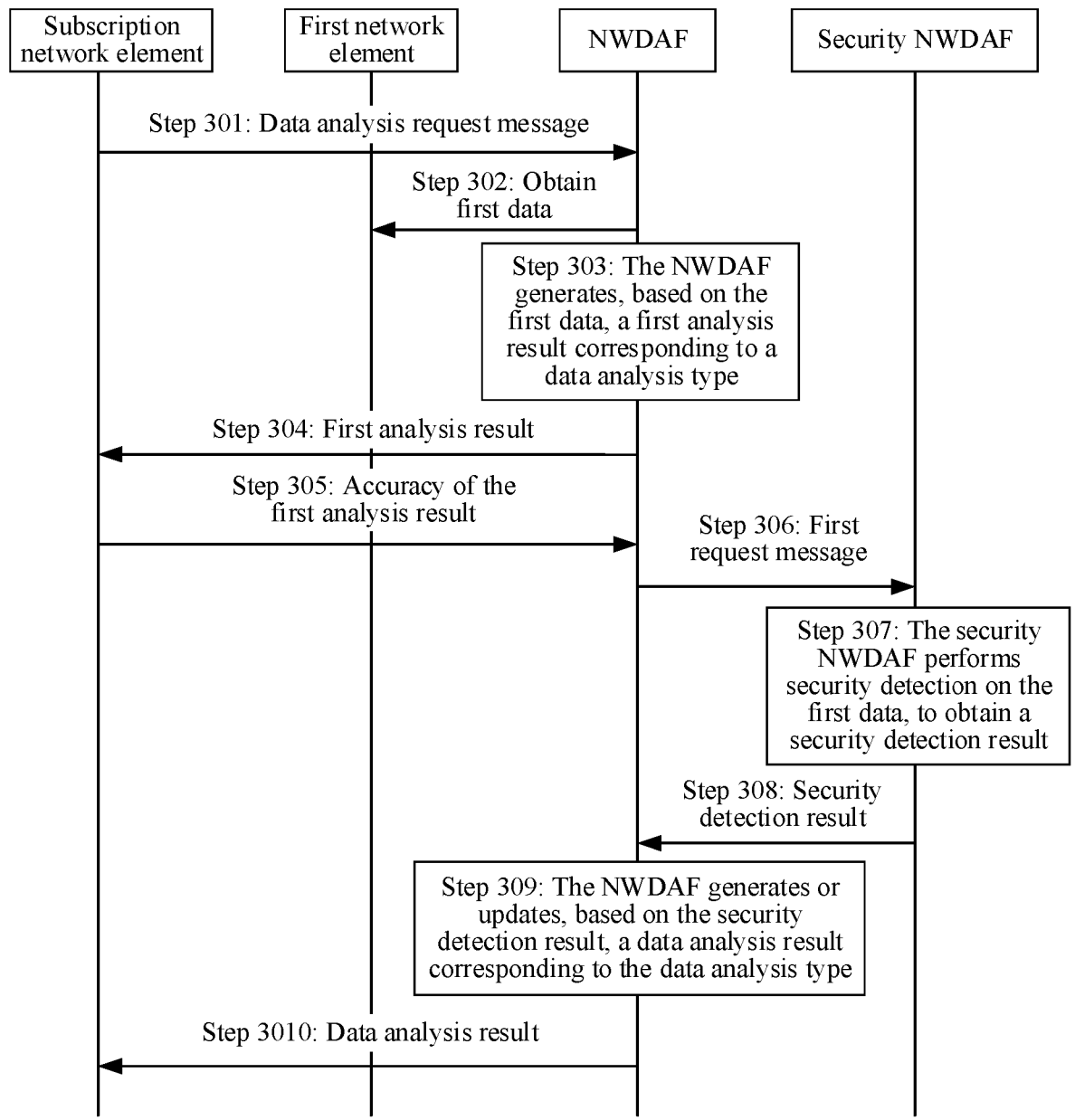
FIG. 3 is a flowchart of a data analysis method according to an embodiment of this application.

FIG. 3 is a flowchart of a data analysis method according to this application. As shown in FIG. 3, the method may include the following steps.

Step 301: A subscription network element sends a data analysis request message to an NWDAF.

The data analysis request message requests a data analysis result corresponding to a to-be-analyzed data analysis type. In addition, the data analysis request message may carry a type (Analytics ID) of the data analysis result, so that the NWDAF can collect corresponding data based on the type of the data analysis result.

For example, the data analysis request message may alternatively be a subscription request message. For example, the subscription network element invokes an Nnwdaf_AnalyticsSubscription_Subscribe service operation of the NWDAF or invokes an Nnwdaf_analytics request service operation, to subscribe to or request, from the NWDAF, a data analysis result desired by the subscription network element, for example, a service experience data analysis result, a network element load data analysis result, or a UE interaction information analysis result. The subscription request message may carry the analytics ID. For example, if the subscription network element subscribes to the service experience data analysis result from the NWDAF, the analytics ID carried in the subscription request message is "Service Experience".

For another example, if the subscription network element subscribes to the network element load data analysis result from the NWDAF, the analytics ID carried in the subscription request message is "NF load information"; or if the subscription network element subscribes to the UE interaction information analysis result from the NWDAF, the analytics ID carried in the subscription request message is "UE communication information".

Step 302: The NWDAF obtains first data from a first network element.

After receiving the data analysis request message sent by the subscription network element, the NWDAF may determine a data provider network element based on the analytics ID carried in the data analysis request message. In a possible implementation, a correspondence between the data analysis type and the data provider network element may be stored in advance. That is, different data analysis types may correspond to different data provider network elements. In addition, the NWDAF may obtain different information from different data provider network elements. For example, when the data provider network element is an AMF, the NWDAF may obtain UE location information, for example, a network location or other geographic location information such as a base station or a cell identifier, from the AMF. When the data provider network element is a UPF, the NWDAF may obtain QoS flow information from the UPF. When the data provider network element is an OAM, the NWDAF may obtain radio access type/frequency selection priority (RFSP) information from the OAM.

It is assumed that, in some embodiments, if the data analysis result subscribed to by the subscription network element from the NWDAF is a first data analysis type, the data provider network element corresponding to the first data analysis type may be the first network element. Certainly, it may be understood that there may be one or more first network elements.

In a possible implementation, the first data obtained by the NWDAF from the first network element may be all data, in the first network element, corresponding to a specified data analysis type.

In another possible implementation, the first data obtained by the NWDAF from the first network element may be some data in the first network element, for example, may be some specific data. For example, when obtaining data from the first network element, the NWDAF further provides a data type. In this way, the first data obtained by the NWDAF from the first network element is data corresponding to the data type.

Step 303: The NWDAF generates, based on the first data, a first analysis result corresponding to the data analysis type.

The first data herein may be training data or inference data, and is used as input data for model training or data inference. In addition, the first data is data for which the NWDAF performs data analysis on the specified data analysis type. The first analysis result herein may be a model, or may be a result obtained based on model inference. This is not limited herein.

When the first data is the training data, the NWDAF may train the training data to obtain an AI model, and obtain the first analysis result based on the AI model. When the first data is the inference data, the NWDAF may input the inference data into a trained AI model to obtain the first analysis result. This process belongs to the conventional technology. Details are not described herein.

Step 301 to step 303 are performed, so that the NWDAF may obtain, based on the correspondence between the data analysis type and the data provider network element that is stored in advance, one or more network elements corresponding to the specified data analysis type, obtain data from these network elements, and perform training and inference by using the obtained data to obtain the data analysis result. This helps improve data analysis efficiency and accuracy.

Step 304: The NWDAF sends the first analysis result to the subscription network element.

After obtaining the first analysis result, the NWDAF may send the first analysis result to the subscription network element. Correspondingly, the subscription network element may receive the analysis result.

In a possible implementation, when sending the first analysis result to the subscription network element, the NWDAF may send a preset accuracy threshold (for example, denoted as a "first threshold") to the subscription network element. The threshold may be used by the subscription network element to determine accuracy of the first analysis result.

Step 305: The subscription network element feeds back the accuracy of the first analysis result to the NWDAF.

After the subscription network element receives the first analysis result and the first threshold, if the accuracy of the first analysis result is lower than the first threshold, it indicates that there may be abnormal data in the first data obtained by the NWDAF, so that the accuracy of the first analysis result is low.

On the contrary, if the accuracy of the first analysis result is higher than the first threshold, it indicates that a possibility that there is abnormal data in the first data obtained by the NWDAF is low, so that the accuracy of the first analysis result is high.

In some embodiments, the first threshold may be used by the subscription network element to send a notification message to the NWDAF when determining that the accuracy of the first analysis result is lower than the first threshold. Correspondingly, the NWDAF may receive the notification message sent by the subscription network element. The notification message may be used to feed back the accuracy of the data analysis result to the NWDAF, so that the NWDAF sends a data detection request message to a security network element.

Step 306: The NWDAF sends a first request message to a security NWDAF, where the first request message requests to perform security detection on the first data.

In some embodiments, that the NWDAF sends the first request message to the security NWDAF may include the following cases:

In a first case, when receiving the notification message sent by the subscription network element, the NWDAF may send the request message for performing security detection to the security NWDAF.

In a second case, because the first analysis result is generated by the NWDAF based on the first data, the NWDAF may also determine the accuracy of the first analysis result based on the first analysis result. In other words, when determining that the accuracy of the first analysis result is lower than the first threshold, the NWDAF may send the request message for performing security detection to the security NWDAF.

Alternatively, the NWDAF may automatically trigger a security detection requirement based on a precision requirement and the like of an AI model training result. To be specific, the NWDAF does not need to wait for the notification message sent by the subscription network element, but may directly send the request message for performing security detection to the security NWDAF.

In a third case, the NWDAF may periodically send the request message for performing security detection to the security NWDAF. In other words, the NWDAF may send, to the security NWDAF at a fixed time interval, the request message for performing security detection. For example, the NWDAF may send the request message for performing security detection to the security NWDAF at an interval of three minutes. Certainly, the NWDAF may alternatively send the request message for performing security detection to the security NWDAF at an interval of one minute. This is not limited in this application.

In a fourth case, when the data analysis request message sent by the subscription network element requests a data analysis result corresponding to a specified range, the NWDAF may send the request message for performing security detection to the security NWDAF.

The specified range may include a range corresponding to at least one of the following types of information: specified time information, specified area information, specified slice information, specified user information, and specified service type information.

Specifically, the specified time information may be a specified time period or a specified time point. The specified area information may be one or more specified cell identifiers, one or more specified tracking area identities (TAIs), an administrative region identifier, geographic area longitude and latitude identifiers, or the like. The specified slice information may be specified network slice selection assistance information (NSSAI), single network slice selection assistance information (S-NSSAI), network slice instance (NSI) information, network slice subnet instance (NSSI) information, or the like. The specified user information may be a specified network element, a specified terminal device (e.g., UE), or a user object (e.g., user). The user information may be a user type (for example, a network element type, a UE type, or a user type), or may be a user identifier (for example, a network element identifier, a UE identifier, or a user type).

Based on one of the foregoing several cases, the NWDAF may send the first request message to the security NWDAF, and the request message may be used to perform security detection on the first data. In other words, the security detection is abnormal data detection, that is, the request message may be used to detect abnormal data in the first data. In this way, the abnormal data existing in the first data can be determined, to process the abnormal data in a timely manner, and improve the accuracy of the data analysis result.

It should be noted that the abnormal data in this application may be poisoning data (abnormal data or attack data, generated by an attacker, whose distribution is similar to that of normal data and that affects the accuracy of the data analysis result, where the poisoning data cannot be easily identified by using an existing data cleaning or outlier detection method). The security network element may perform security detection on the first data to obtain the poisoning data existing in the first data, to help the data analysis network element clear the poisoning data in the obtained data. This improves the accuracy of the data analysis result.

Specifically, the first request message may include at least one of the following information: information about the first data, a first model, and a first algorithm. The first model is a model established by the NWDAF based on the first data or a model determined by the NWDAF in advance for the data analysis type. The first algorithm is an algorithm recommended by the NWDAF to the security NWDAF, and may include at least one algorithm used when the NWDAF establishes the first model. For example, the first algorithm may be a linear regression algorithm, a cyclic neural network algorithm, or the like.

It should be noted that the information about the first data may be the data, or may be a storage address of the first data, or may be a file name or the like for storing the first data. This is not limited in this application.

In some other embodiments, the first request message may further include an abnormal data proportion, and the abnormal data proportion indicates a proportion of a data volume of the abnormal data to a data volume of the first data. In other words, the first request message may further include the proportion of the data volume of the abnormal data to the data volume of the first data. It may be understood that the data proportion may alternatively be a proportion of the data volume of the abnormal data to a data volume of the normal data (data other than the abnormal data in the first data), or the like. This is not limited in this application.

In some embodiments, the abnormal data proportion may be obtained in the following several manners:

In a manner 1, the subscription network element may estimate, based on the accuracy of the first analysis result, the proportion of the data volume of the abnormal data to the data volume of the first data. In other words, in step 305, when feeding back the accuracy of the first analysis result to the NWDAF, the subscription network element may also feed back, to the NWDAF, the abnormal data proportion estimated by the subscription network element.

In a manner 2, the NWDAF may estimate the abnormal data proportion based on information such as the precision requirement of the AI model training result. For example, the NWDAF may obtain the AI model through training based on the first data, then obtain an analysis result of test data by using the AI model on the test data, and estimate the abnormal data proportion based on a mean square error of the analysis result.

In a manner 3, the security NWDAF may set or estimate the abnormal data proportion.

Step 307: The security NWDAF performs security detection on the first data to obtain the security detection result.

In a possible implementation, the security detection may be abnormal data detection. For example, the security detection may be data poisoning detection, for example, a TRIM algorithm (e.g., a trimming algorithm). When the TRIM algorithm is used to detect the poisoning data, an outlier is not simply removed. Instead, the poisoning data and the normal data are used together to train a linear regression model, and the TRIM algorithm is used to iteratively estimate a regression parameter. In each iteration, a data subset that minimizes a loss function is selected, and then training is performed again on this data subset until the loss function converges. After convergence, the identified data subset is used as the normal data (namely, second data), and other data is used as the poisoning data (namely, the abnormal data). Optionally, an AI model generated in the last iteration may be used as a model (namely, a second model) recommended to the NWDAF.

Specifically, the security detection result may include at least one of the following information: information about the abnormal data, information about the second data, and a second algorithm; and the second data is data other than the abnormal data in the first data, and the second algorithm is a detection algorithm used by the security NWDAF to obtain the abnormal data or the second data. For example, the second algorithm may be a linear regression algorithm, a deep neural network algorithm, or the like.

It should be noted that the information about the abnormal data may be the abnormal data, or may be a storage address of the abnormal data, or may be a file name or the like corresponding to the abnormal data. The information about the second data may be the second data, or may be a storage address of the second data, or may be a file name or the like corresponding to the second data. This is not limited in this application.

After receiving the first request message sent by the NWDAF, the security NWDAF may perform security detection on the first data by using the second algorithm to obtain the security detection result. There may be one or more second algorithms. This is not limited in this application. It should be noted that, when there are the plurality of second algorithms, there may correspondingly be a plurality of detection results of the abnormal data and a plurality of detection results of the second data.

In a possible implementation, the NWDAF may store one or more algorithms in advance. For example, the algorithm that is stored by the NWDAF in advance is denoted as a "third algorithm". There may be one or more first algorithms that are included in the first request message sent by the NWDAF to the security NWDAF, and the security NWDAF may determine the second algorithm based on the first algorithm and/or the third algorithm.

Specifically, when a quantity of first algorithms included in the first request message is 0, the security NWDAF may independently determine an algorithm to be used for performing security detection. For example, the security NWDAF may select one or more algorithms in the third algorithm that is stored in advance to perform security detection.

When a quantity of first algorithms included in the first request message is 1, the security NWDAF may perform security detection by using the only algorithm in the first algorithm. Certainly, the security NWDAF may alternatively not use the only algorithm in the first algorithm to perform security detection, but select any algorithm in the third algorithm that is stored in advance to perform security detection. This is not limited in this application.

When there are a plurality of first algorithms included in the first request message, the security NWDAF may determine an intersection set of the first algorithm and the third algorithm as the second algorithm. That is, the security NWDAF performs security detection by using an algorithm that exists in both the first algorithm and the third algorithm. Certainly, it may be understood that the security NWDAF may alternatively not select the intersection set of the first algorithm and the third algorithm, and independently determine an algorithm to be used, or the like. This is not limited in this application.

Step 308: The security NWDAF feeds back the security detection result to the NWDAF.

After performing abnormal data detection on the first data, the security NWDAF may send the security detection result to the NWDAF. Correspondingly, the NWDAF may receive the security detection result.

Step 309: The NWDAF generates or updates, based on the security detection result, the data analysis result corresponding to the data analysis type.

In some embodiments, the security detection result may further include a second model, and the second model is a model established by the security NWDAF based on the second data. In other words, the second model may be a recommendation model generated after the security NWDAF performs security detection. In this way, the NWDAF may generate or update, based on the second model, the data analysis result corresponding to the data analysis type.

In some other embodiments, the NWDAF may obtain the second data from the security detection result, train the second data to obtain a third model, and generate or update, based on the third model, the data analysis result corresponding to the data analysis type. The second data is data other than the abnormal data in the first data. In other words, the NWDAF may obtain data other than the abnormal data from the security detection result, and then perform training based on the data to obtain a new AI model, to obtain the data analysis result.

It should be noted that the NWDAF may alternatively obtain the abnormal data from the security detection result, extract the abnormal data from the first data to obtain the second data, then train the second data to obtain the third model, and generate or update, based on the third model, the data analysis result corresponding to the data analysis type. This is not limited in this application.

Further, when the security detection result includes the second algorithm, the NWDAF may train the second data by using the second algorithm to obtain the third model.

In this way, the AI model obtained by the NWDAF through training based on data without the abnormal data is more accurate, and the obtained data analysis result is also more accurate.

Step 3010: The NWDAF sends the data analysis result to the subscription network element.

Based on the foregoing steps, the NWDAF may obtain a new data analysis result, and then feed back the data analysis result to the subscription network element.

In some embodiments, the security NWDAF may extract the abnormal data from the first data by detecting the first data, and then train a model based on data obtained after the abnormal data is extracted to obtain a new data analysis result. In this way, the accuracy of the data analysis result can be improved, and stability of the AI system can be improved.

Figure 4:
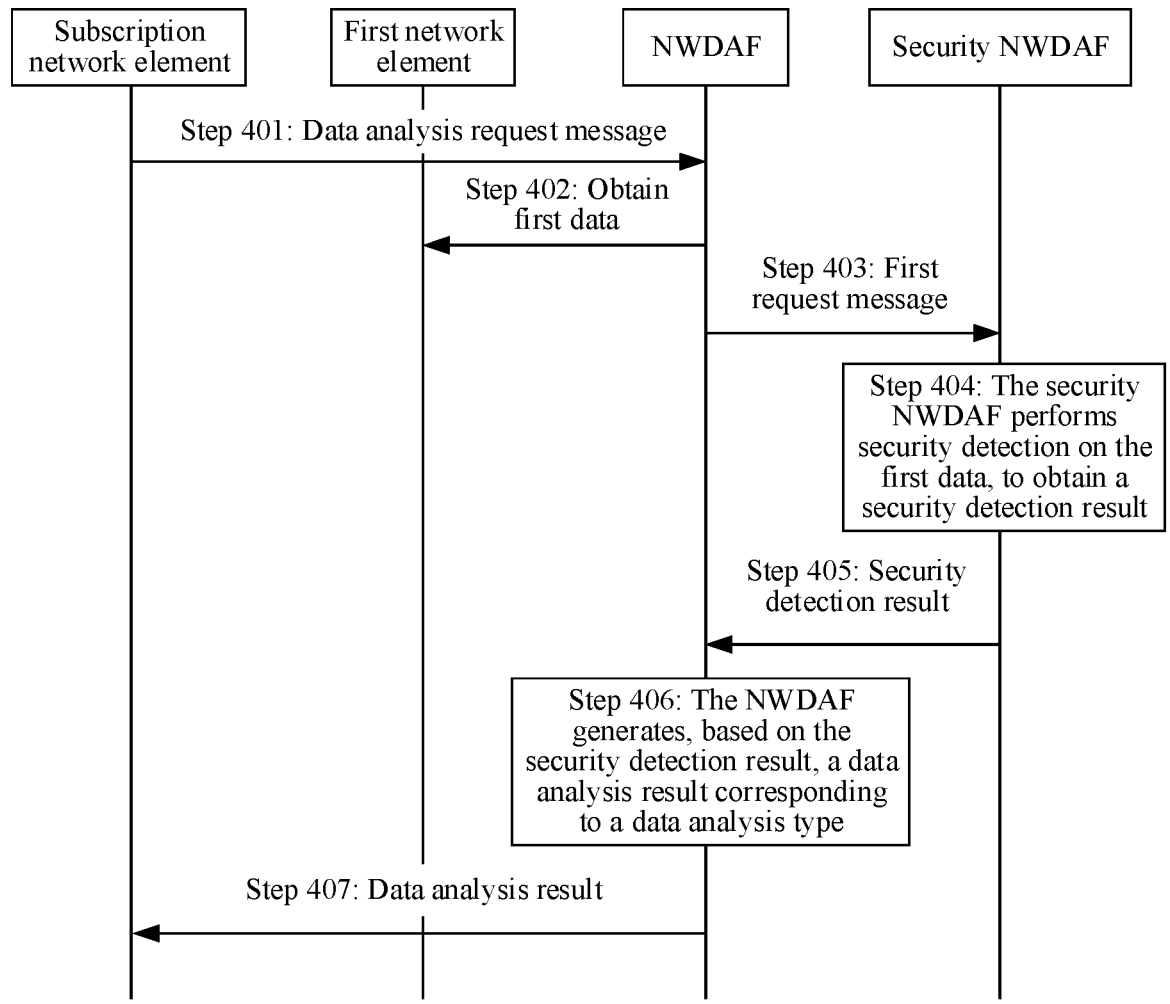
FIG. 4 is a flowchart of another data analysis method according to an embodiment of this application.

FIG. 4 is a flowchart of another data analysis method according to an embodiment of this application. As shown in FIG. 4, the method includes the following steps.

It should be noted that step 401, step 402, step 404, step 405, and step 406 are the same as step 301, step 302, step 307, step 308, step 309, and step 3010 in the embodiment shown in FIG. 3. For details, refer to the descriptions in the embodiment shown in FIG. 3. Details are not described again in this embodiment.

Step 401: A subscription network element sends a data analysis request message to an NWDAF.

Step 402: The NWDAF obtains first data from a first network element.

Step 403: The NWDAF sends a first request message to a security NWDAF, where the first request message requests to perform security detection on the first data.

In some embodiments, the NWDAF may send the first request message to the security NWDAF based on the following several cases:

In a first case, the NWDAF may periodically send the first request message to the security NWDAF. Alternatively, in other words, the NWDAF may send the request message for performing security detection to the security NWDAF at a fixed time interval. For example, the NWDAF may send the request message for performing security detection to the security NWDAF at an interval of five minutes. Certainly, the NWDAF may alternatively send the request message for performing security detection to the security NWDAF at an interval of two minutes. This is not limited in this application.

In a second case, when the data analysis request message sent by the subscription network element requests a data analysis result corresponding to a specified range, the NWDAF may send the request message for performing security detection to the security NWDAF.

The specified range may include a range corresponding to at least one of the following types of information: time information, area information, slice information, user information, or service type information.

In one of the foregoing two cases, the NWDAF may send the first request message to the security NWDAF, to detect abnormal data in the first data to obtain data other than the abnormal data, so that the data analysis result subscribed to by the subscription network element is more accurate.

In a possible implementation, the first request message may include at least one of the following types of information: information about the first data, a first model, or a first algorithm; and the first model is a model determined by the NWDAF in advance for a data analysis type, and the first algorithm is at least one algorithm used when the NWDAF establishes the first model.

It should be noted that the information about the first data may be the data, or may be a storage address of the data, or may be a file name or the like of the data. This is not limited in this application.

A difference between step 306 in the embodiment shown in FIG. 3 and step 403 lies in that the first model in step 403 is only a model determined by the NWDAF in advance for the data analysis type, and a first analysis result does not need to be exchanged with the subscription network element in advance.

It should be noted that, in the embodiment shown in FIG. 3, before sending the first request message to the security NWDAF, the NWDAF has performed data analysis on the first data once. However, in the embodiment shown in FIG. 4, before sending the first request message to the security NWDAF, the NWDAF does not perform data analysis on the first data, but directly performs security detection on obtained data. In other words, in the embodiment shown in FIG. 3, security detection is performed on data after the data analysis result is obtained; and in the embodiment shown in FIG. 4, security detection is performed on data before the data analysis result is obtained.

Step 404: The security NWDAF performs security detection on the first data to obtain the security detection result.

Step 405: The security NWDAF feeds back the security detection result to the NWDAF.

Step 406: The NWDAF generates, based on the security detection result, a data analysis result corresponding to the data analysis type.

Step 407: The NWDAF sends the data analysis result to the subscription network element.

According to the method in some embodiments, before the NWDAF performs model training, security detection is performed on the obtained data, and then model training is performed based on detected data other than the abnormal data. In this way, model accuracy can be improved, and the data analysis result is more accurate.

It should be understood that, the data analysis method in the embodiment shown in FIG. 3 is compared with the data analysis method in the embodiment shown in FIG. 4. In the method in the embodiment shown in FIG. 4, security detection is first performed on the obtained data, and then the data analysis result is generated based on the security detection result, that is, data security detection is first performed and then an AI model is used. Therefore, the method in the embodiment shown in FIG. 4 is applicable to a scenario in which security of the AI model is high, so that security of the AI model can be ensured.

It should be noted that, the steps in embodiments of this application are not limited to all steps that need to be performed. Optionally, one or more steps in the foregoing embodiments are performed.

The foregoing mainly describes the solutions provided in this application from a perspective of interaction between network elements. It may be understood that, to implement the foregoing functions, each network element includes a corresponding hardware structure and/or software module for executing each function. A person skilled in the art should be quite easily aware that, in combination with the examples described in embodiments disclosed in this specification, units and algorithm steps can be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

With reference to the accompanying drawings, the following describes apparatuses configured to implement the foregoing methods in embodiments of this application. Therefore, all the foregoing content may be used in the following embodiments. Repeated content is not described again.

Figure 5:
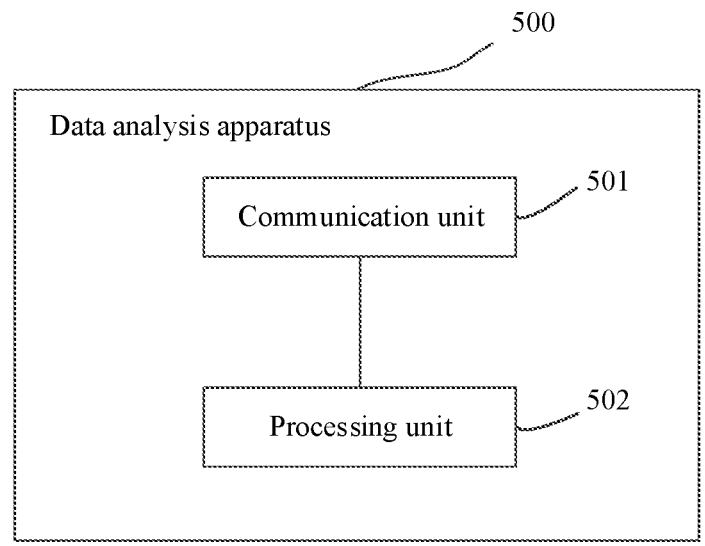
FIG. 5 is a schematic diagram of a data analysis apparatus according to an embodiment of this application.

Based on a same concept as the foregoing method embodiments, an embodiment of this application provides a data analysis apparatus. When an integrated unit (e.g., integrated circuit) is used, FIG. 5 is a schematic diagram of a logical structure of a data analysis apparatus. The data analysis apparatus may be used in a data analysis network element. As shown in FIG. 5, the data analysis apparatus 500 includes a communication unit 501 and a processing unit 502. In an example, the apparatus 500 is configured to implement a function of the data analysis network element in the foregoing methods. For example, the apparatus may be a data analysis network element, or may be an apparatus in the data analysis network element, for example, a chip system.

The communication unit 501 is configured to: send a first request message to a security network element, where the first request message is used to request to perform security detection on first data, and the first data is data for which the data analysis network element performs data analysis on a specified data analysis type; and receive a security detection result fed back by the security network element; and the processing unit 502 is configured to generate or update, based on the security detection result, a data analysis result corresponding to the data analysis type.

In a possible implementation, the processing unit 502 is further configured to: before the first request message is sent to a first network element, generate, based on the first data, a first analysis result corresponding to the data analysis type, and determine that accuracy of the first analysis result is lower than a first threshold.

In a possible implementation, the processing unit 502 is further configured to: before the first request message is sent to a first network element, generate, based on the first data, a first analysis result corresponding to the data analysis type; the communication unit 501 is further configured to: send the first analysis result and a first threshold to a subscription network element, where the first threshold is used by the subscription network element to determine that accuracy of the first analysis result is lower than the first threshold; and receive a notification message sent by the subscription network element when the subscription network element determines that the accuracy of the first analysis result is lower than the first threshold.

The communication unit 501 is configured to send the first request message to the security network element in the following manner: sending the first request message to the security network element based on the notification message.

In a possible implementation, the communication unit 501 is further configured to: before the first request message is sent to the security network element, receive a data analysis request message sent by a subscription network element, where the data analysis request message is used to request the data analysis result corresponding to the data analysis type; and the processing unit 502 is further configured to determine a data analysis result, corresponding to a specified range, that is requested by the data analysis request message.

In a possible implementation, the specified range includes a range corresponding to at least one of the following types of information: time information, area information, slice information, user information, or service type information.

In a possible implementation, the first request message includes at least one of the following types of information: information about the first data, a first model, or a first algorithm; and the first model is a model established by the data analysis network element based on the first data or a model determined by the data analysis network element in advance for the data analysis type, and the first algorithm includes at least one algorithm used when the data analysis network element establishes the first model.

In a possible implementation, the security detection is abnormal data detection; and the first request message includes an abnormal data proportion, and the abnormal data proportion indicates a proportion of a data volume of abnormal data to a data volume of the first data.

In a possible implementation, the security detection result includes at least one of the following types of information: information about the abnormal data, information about second data, or a second algorithm; and the second data is data other than the abnormal data in the first data, and the second algorithm is a detection algorithm used by the security network element to obtain the abnormal data or the second data.

In a possible implementation, the security detection result includes a second model, and the second model is a model established by the first network element based on the second data; and the processing unit 502 is configured to generate or update, based on the security detection result, the data analysis result corresponding to the data analysis type in the following manner: generating or updating, based on the second model, the data analysis result corresponding to the data analysis type.

In a possible implementation, the processing unit 502 is configured to generate or update, based on the security detection result, the data analysis result corresponding to the data analysis type in the following manner: obtaining the second data based on the security detection result, where the second data is data other than the abnormal data in the first data; and training the second data to obtain a third model, and generating or updating, based on the third model, the data analysis result corresponding to the data analysis type.

In a possible implementation, when the security detection result includes the second algorithm, that the processing unit 502 is configured to train the second data in the following manner to obtain a third model includes: training the second data by using the second algorithm to obtain the third model.

In a possible implementation, the first data is training data or inference data corresponding to the data analysis type.

In a possible implementation, the security network element is a security NWDAF network element.

In a possible implementation, the security detection is data poisoning detection.

When a hardware form is used for implementation, in some embodiments, the communication unit 501 may be a communication interface, a receiver, a transmitter, a transceiver circuit, or the like. The communication interface is a general term, and may include one or more interfaces.

Figure 6:
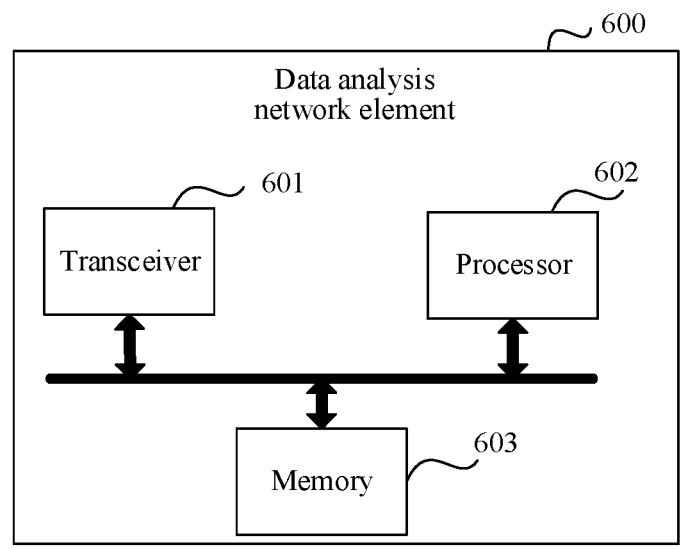
FIG. 6 is a schematic structural diagram of a data analysis network element according to an embodiment of this application.

When the communication unit 501 is a transceiver and the processing unit 502 is a processor, the data analysis apparatus 500 in some embodiments may be shown in FIG. 6. FIG. 6 shows a data analysis network element 600 according to an embodiment of this application. The data analysis network element 600 may include a transceiver 601, a processor 602, and a memory 603. The memory 603 stores instructions or a program. The processor 602 is configured to execute the instructions or the program stored in the memory 603. The transceiver 601 is configured to perform an operation performed by the communication unit 501 in the foregoing embodiments. The processor 602 is configured to perform an operation performed by the processing unit 502 in the foregoing embodiment.

It should be understood that the data analysis apparatus 500 or the data analysis network element 600 in the embodiments of this application may correspond to the data analysis network element in the embodiments shown in FIG. 2, FIG. 3, and FIG. 4, and operations and/or functions of the modules in the data analysis apparatus 500 or the data analysis network element 600 are respectively used to implement corresponding procedures in the embodiments shown in FIG. 2, FIG. 3, and FIG. 4. For brevity, details are not described herein again.

Figure 7:
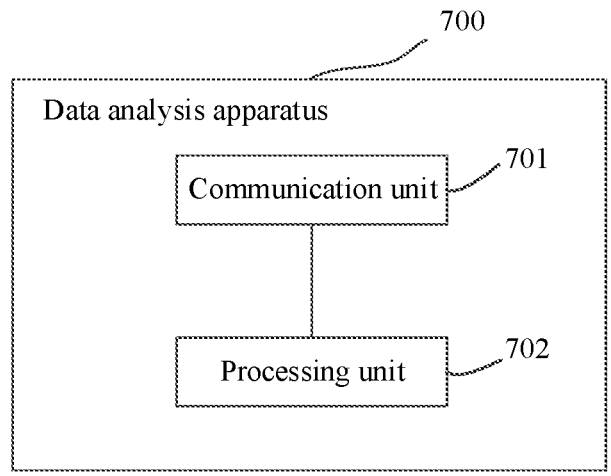
FIG. 7 is a schematic diagram of another data analysis apparatus according to an embodiment of this application.

FIG. 7 is a schematic diagram of a logical structure of a data analysis apparatus according to an embodiment of this application. The data analysis apparatus may be applied to a security network element. Refer to FIG. 7. The data analysis apparatus 700 includes a communication unit 701 and a processing unit 702. In an example, the apparatus 700 is configured to implement a function of the security network element in the foregoing methods. For example, the apparatus may be a security network element, or may be an apparatus in the security network element, for example, a chip system.

The communication unit 701 is configured to receive a first request message sent by a data analysis network element, where the first request message is used to request to perform security detection on first data, and the first data is a dataset for which the data analysis network element performs data analysis on a specified data analysis type; and the processing unit 702 is configured to perform security detection on the first data to obtain a security detection result, where the communication unit 701 is further configured to send the security detection result to the data analysis network element.

In a possible implementation, the first request message includes at least one of the following types of information: information about the first data, a first model, or a first algorithm; and the first model is a model established by the data analysis network element based on the first data or a model determined by the data analysis network element in advance for the data analysis type, and the first algorithm includes at least one algorithm used when the data analysis network element establishes the first model.

In a possible implementation, the security detection is abnormal data detection; and the first request message includes an abnormal data proportion, and the abnormal data proportion indicates a proportion of a data volume of abnormal data to a data volume of the first data.

In a possible implementation, the security detection result includes at least one of the following types of information: information about the abnormal data, information about second data, or a second algorithm; and the second data is data other than the abnormal data in the first data, and the second algorithm is a detection algorithm used by the security network element to obtain the abnormal data or the second data.

In a possible implementation, the security detection result includes a second model, and the second model is a model established by the security network element based on the second data.

In a possible implementation, the processing unit 702 is configured to perform security detection on the first data in the following manner: performing security detection on the first data by using the second algorithm.

In a possible implementation, the processing unit 702 is further configured to determine the second algorithm based on the first algorithm and/or a third algorithm, where the first algorithm includes at least one algorithm used when the data analysis network element establishes the first model, and the third algorithm is at least one algorithm stored in the security network element in advance.

In a possible implementation, the processing unit 702 is configured to determine the second algorithm based on the first algorithm and/or the third algorithm in the following manner: determining an intersection set of the first algorithm and the third algorithm as the second algorithm.

In a possible implementation, the first data is training data or inference data corresponding to the data analysis type.

In a possible implementation, the data analysis apparatus is a security NWDAF network element.

In a possible implementation, the security detection is data poisoning detection.

When a hardware form is used for implementation, in some embodiments, the communication unit 701 may be a communication interface, a receiver, a transmitter, a transceiver circuit, or the like. The communication interface is a general term, and may include one or more interfaces.

Figure 8:
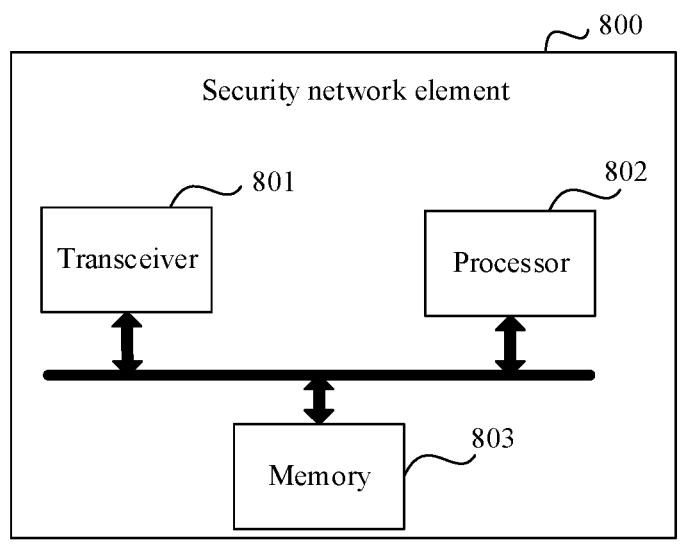
FIG. 8 is a schematic structural diagram of a security network element according to an embodiment of this application.

When the communication unit 701 is a transceiver and the processing unit 702 is a processor, the data analysis apparatus 700 in some embodiments may be shown in FIG. 8. FIG. 8 shows a security network element 800 according to an embodiment of this application. The security network element 800 may include a transceiver 801, a processor 802, and a memory 803. The memory 803 stores instructions or a program. The processor 802 is configured to execute the instructions or the program stored in the memory 803. The transceiver 801 is configured to perform an operation performed by the communication unit 701 in the foregoing embodiment. The processor 802 is configured to perform an operation performed by the processing unit 702 in the foregoing embodiment.

It should be understood that the data analysis apparatus 700 or the security network element 800 in the embodiments of this application may correspond to the security network element in the embodiments shown in FIG. 2, FIG. 3, and FIG. 4, and operations and/or functions of the modules in the data analysis apparatus 700 or the security network element 800 are respectively used to implement corresponding procedures in the embodiments shown in FIG. 2, FIG. 3, and FIG. 4. For brevity, details are not described herein again.

It should be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device (PLC), a discrete gate or a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

Figure 9:
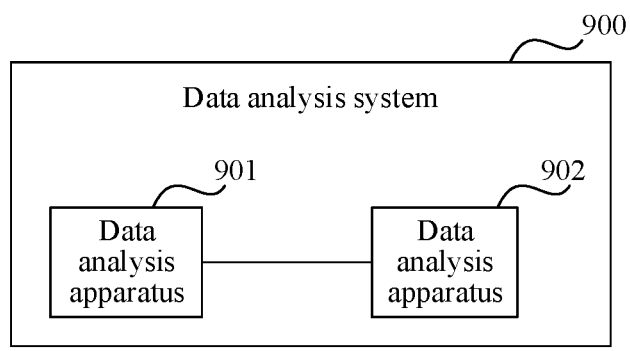
FIG. 9 is a schematic diagram of a data analysis system according to this application.

Further, FIG. 9 is a schematic diagram of a data analysis system 900 according to an embodiment of this application. The system 900 may include a data analysis apparatus 901 and a data analysis apparatus 902. For example, the data analysis apparatus 901 may be configured to: send a first request message to a security network element, where the first request message is used to request to perform security detection on first data, and the first data is data for which a data analysis network element performs data analysis on a specified data analysis type; and receive a security detection result fed back by the security network element. The data analysis apparatus 902 may be configured to: receive a first request message sent by a data analysis network element, where the first request message is used to request to perform security detection on first data, and the first data is data for which the data analysis network element performs data analysis on a specified data analysis type; and perform security detection on the first data to obtain a security detection result.

It may be understood that, for a specific implementation process and corresponding beneficial effects of the system used for the foregoing data analysis methods, refer to related descriptions in the foregoing method embodiments. Details are not described herein again.

Based on a same concept as that of the foregoing method embodiments, an embodiment of this application further provides a computer-readable storage medium. The computer-readable storage medium stores a computer program. When the program is executed by a processor, the computer is enabled to perform an operation performed by the data analysis network element or the security network element in any one of the foregoing method embodiments and the possible implementations of the method embodiments.

Based on a same concept as the foregoing method embodiments, this application further provides a computer program product. When the computer program product is invoked and executed by a computer, the computer may be enabled to implement an operation performed by the data analysis network element or the security network element in any one of the foregoing method embodiments and the possible implementations of the method embodiments.

Based on a same concept as the foregoing method embodiments, this application further provides a chip or a chip system. The chip may include a processor. The chip may further include a memory (or a storage module) and/or a transceiver (or a communication module), or the chip is coupled to a memory (or a storage module) and/or a transceiver (or a communication module). The transceiver (or the communication module) may be configured to support the chip in wired and/or wireless communication, and the memory (or the storage module) may be configured to store a program. The processor invokes the program to implement an operation performed by the data analysis network element or the security network element in any one of the foregoing method embodiments and the possible implementations of the method embodiments. The chip system may include the chip, or may include the chip and another discrete component, such as a memory (or a storage module) and/or a transceiver (or a communication module).

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of this application. Therefore, the protection scope of embodiments of this application shall be subject to the protection scope of the claims.

What is claimed is:

1. A data analysis method, comprising:
   generating, by a data analysis network element based on a first data, a first analysis result corresponding to a data analysis type;
   sending, by the data analysis network element, the first analysis result and a first threshold to a subscription network element, wherein the first threshold is used by the subscription network element to determine that accuracy of the first analysis result is lower than the first threshold;
   receiving, by the data analysis network element, a notification message sent by the subscription network element when the accuracy of the first analysis result is lower than the first threshold;
   sending, by the data analysis network element, a first request message to a security network element, wherein the first request message is used to request to perform security detection on the first data, and the first data is data for which the data analysis network element performs data analysis on the data analysis type;
   receiving, by the data analysis network element, a security detection result fed back by the security network element; and
   generating or updating, by the data analysis network element based on the security detection result, a data analysis result corresponding to the data analysis type.

2. The method according to claim 1, wherein before the sending, by the data analysis network element, the first request message to a first network element, the method further comprises:
   generating, by the data analysis network element based on the first data, the first analysis result corresponding to the data analysis type; and
   determining, by the data analysis network element, that accuracy of the first analysis result is lower than the first threshold.

3. The method according to claim 1, wherein
   the sending, by the data analysis network element, the first request message to the security network element comprises:
   sending, by the data analysis network element, the first request message to the security network element based on the notification message.

4. The method according to claim 1, wherein before the sending, by the data analysis network element, the first request message to a security network element, the method further comprises:
   receiving, by the data analysis network element, a data analysis request message sent by a subscription network element, wherein the data analysis request message is used to request the data analysis result corresponding to the data analysis type; and
   determining, by the data analysis network element, a data analysis result, corresponding to a specified range, that is requested by the data analysis request message.

5. The method according to claim 4, wherein the specified range comprises a range corresponding to at least one of the following information: specified time information, specified area information, specified slice information, specified user information, or specified service type information.

6. The method according to claim 1, wherein the first request message comprises at least one of the following information: information about the first data, a first model, or a first algorithm; and
   the first model is a model established by the data analysis network element based on the first data or a model determined by the data analysis network element in advance for the data analysis type, and the first algorithm comprises at least one algorithm used when the data analysis network element establishes the first model.

7. The method according to claim 1, wherein the security detection is abnormal data detection; and the first request message comprises an abnormal data proportion, and the abnormal data proportion indicates a proportion of a data volume of abnormal data to a data volume of the first data.

8. The method according to claim 1, wherein the security detection result comprises at least one of the following information: information about the abnormal data, information about second data, or a second algorithm; and
   the second data is data other than the abnormal data in the first data, and the second algorithm is a detection algorithm used by the security network element to obtain the abnormal data or the second data.

9. The method according to claim 1, wherein the security detection result comprises a second model, and the second model is a model established by the first network element based on the second data; and
   the generating or updating, by the data analysis network element based on the security detection result, a data analysis result corresponding to the data analysis type comprises:

generating or updating, by the data analysis network element based on the second model, the data analysis result corresponding to the data analysis type.

10. The method according to claim 1, wherein the generating or updating, by the data analysis network element based on the security detection result, a data analysis result corresponding to the data analysis type comprises:
  obtaining, by the data analysis network element, the second data based on the security detection result, wherein the second data is data other than the abnormal data in the first data; and
  training, by the data analysis network element, the second data to obtain a third model, and generating or updating, based on the third model, the data analysis result corresponding to the data analysis type.

11. The method according to claim 10, wherein when the security detection result comprises the second algorithm, the training, by the data analysis network element, the second data to obtain a third model comprises:
  training, by the data analysis network element, the second data by using the second algorithm to obtain the third model.

12. A data analysis method, comprising:
  generating, by a data analysis network element based on a first data, a first analysis result corresponding to a data analysis type;
  sending, by the data analysis network element, the first analysis result and a first threshold to a subscription network element, wherein the first threshold is used by the subscription network element to determine that accuracy of the first analysis result is lower than the first threshold;
  receiving, by the data analysis network element, a notification message sent by the subscription network element when the accuracy of the first analysis result is lower than the first threshold;
  sending, by the data analysis network element, the first analysis result and the first threshold to a subscription network element, wherein the first threshold is used by the subscription network element to determine that accuracy of the first analysis result is lower than the first threshold;
  receiving, by a security network element, a first request message sent by the data analysis network element, wherein the first request message is used to request to perform security detection on the first data, and the first data is a dataset for which the data analysis network element performs data analysis on the data analysis type;
  performing, by the security network element, security detection on the first data to obtain a security detection result; and
  sending, by the security network element, the security detection result to the data analysis network element.

13. The method according to claim 12, wherein the first request message comprises at least one of the following information: information about the first data, a first model, or a first algorithm; and
  the first model is a model established by the data analysis network element based on the first data or a model determined by the data analysis network element in advance for the data analysis type, and the first algorithm comprises at least one algorithm used when the data analysis network element establishes the first model.

14. The method according to claim 12, wherein the security detection is abnormal data detection; and the first request message comprises an abnormal data proportion, and the abnormal data proportion indicates a proportion of a data volume of abnormal data to a data volume of the first data.

15. The method according to claim 12, wherein the security detection result comprises at least one of the following information: information about the abnormal data, information about second data, or a second algorithm; and
  the second data is data other than the abnormal data in the first data, and the second algorithm is a detection algorithm used by the security network element to obtain the abnormal data or the second data.

16. The method according to claim 15, wherein the performing, by the security network element, security detection on the first data comprises:
  performing, by the security network element, security detection on the first data by using the second algorithm.

17. The method according to claim 15, wherein the method further comprises:
  determining, by the security network element, the second algorithm based on the first algorithm and/or a third algorithm, wherein the first algorithm comprises at least one algorithm used when the data analysis network element establishes the first model, and the third algorithm is at least one algorithm stored in the security network element in advance.

18. The method according to claim 17, wherein the determining, by the security network element, the second algorithm based on the first algorithm and/or a third algorithm comprises:
  determining, by the security network element, an intersection set of the first algorithm and the third algorithm as the second algorithm.

19. The method according to claim 12, wherein the security detection result comprises a second model, and the second model is a model established by the security network element based on the second data.

20. A data analysis apparatus, comprising:
  at least one processor; and
  a memory, storing instructions, which when executed by the at least one processor, cause the data analysis apparatus to implement the following method:
  generating, by a data analysis network element based on a first data, a first analysis result corresponding to a data analysis type;
  sending, by the data analysis network element, the first analysis result and a first threshold to a subscription network element, wherein the first threshold is used by the subscription network element to determine that accuracy of the first analysis result is lower than the first threshold;
  receiving, by the data analysis network element, a notification message sent by the subscription network element when the accuracy of the first analysis result is lower than the first threshold;
  sending the first request message to a security network element, wherein the first request message is used to request to perform security detection on the first data, and the first data is data for which the data analysis network element performs data analysis on the data analysis type;
  receiving a security detection result fed back by the security network element; and generating or updating, based on the security detection result, a data analysis result corresponding to the data analysis type.

\* \* \* \* \*